(12) United States Patent
Gonzalez et al.

(10) Patent No.: US 12,202,747 B2
(45) Date of Patent: Jan. 21, 2025

(54) WATER PURIFIER AND WATER PURIFICATION SYSTEM

(71) Applicant: Plasma Innova S.A., San Jose, CA (US)

(72) Inventors: Erick Silesky Gonzalez, San Jose (CR); Jose Asenjo Castillo, San Jose (CR); Jaime Mora Meléndez, San Jose (CR); Juan Carlos Brenes Simon, San Jose (CR)

(73) Assignee: Plasma Innova S.A., San Jose (CR)

( * ) Notice: Subject to any disclaimer, the term of this patent is extended or adjusted under 35 U.S.C. 154(b) by 179 days.

(21) Appl. No.: 17/455,669

(22) Filed: Nov. 19, 2021

(65) Prior Publication Data

US 2022/0162095 A1    May 26, 2022

(30) Foreign Application Priority Data

Nov. 20, 2020   (EP) .................................... 20209002

(51) Int. Cl.
   *C02F 1/46*     (2023.01)
   *H05H 1/24*     (2006.01)
   (Continued)

(52) U.S. Cl.
   CPC ........... *C02F 1/4608* (2013.01); *H05H 1/245* (2021.05); *C02F 2001/46152* (2013.01);
   (Continued)

(58) Field of Classification Search
   CPC .......... C02F 1/4608; C02F 2001/46152; C02F 2103/02; C02F 2201/002; C02F 2201/48;
   (Continued)

(56) References Cited

U.S. PATENT DOCUMENTS

| 3,972,800 | A | * | 8/1976 | King | ......................... | B03C 5/02 |
| | | | | | | 204/671 |
| 5,635,059 | A | | 6/1997 | Johnson | | |
| 6,294,137 | B1 | * | 9/2001 | McLaine | ................... | C02F 1/48 |
| | | | | | | 204/671 |

(Continued)

FOREIGN PATENT DOCUMENTS

JP          4947807 B2    6/2012

OTHER PUBLICATIONS

Giuseppina Iervolino, Vincenzo Vaiano, Vincenzo Palma, Enhanced removal of water pollutants by dielectric barrier discharge non-thermal plasma reactor, Separation and Purification Technology, vol. 215, 2019, pp. 155-162, ISSN 1383-5866, https://doi.org/10.1016/j.seppur.2019.01.007. (https://www.sciencedirect.com/science/article/pii/S1383586618337432).

(Continued)

*Primary Examiner* — Pranav N Patel
(74) *Attorney, Agent, or Firm* — Orbit IP, LLP; Marc G. Martino

(57) ABSTRACT

A water purifier for home use, irrigation systems used for crop cultivation or the pharmaceutical industry includes a water inlet for a water to be purified and a water outlet for a purified water. A water treatment chamber is fluidly connected to the water inlet and the water outlet. The water treatment chamber is confined by a chamber wall. The water purifier includes a high-voltage plasma unit for generating a cold plasma within the water treatment chamber. The plasma unit has a first electrode and a second electrode. The first electrode is arranged inside the water treatment chamber such that, during use of the water purifier, it is contacted by the water. The second electrode is disposed spaced apart from the first electrode and electrically insulated therefrom by a dielectric. The water purifier further relates to a water purification system.

11 Claims, 2 Drawing Sheets

(51) Int. Cl.
*C02F 1/461* (2023.01)
*C02F 103/02* (2006.01)

(52) U.S. Cl.
CPC .... *C02F 2103/02* (2013.01); *C02F 2201/002* (2013.01); *C02F 2201/48* (2013.01); *C02F 2303/04* (2013.01); *C02F 2307/06* (2013.01); *C02F 2307/14* (2013.01)

(58) Field of Classification Search
CPC .............. C02F 2303/04; C02F 2307/06; C02F 2307/14; C02F 2201/46175; C02F 1/30; C02F 2201/003; C02F 2301/022; H05H 1/245; H05H 1/2418; H05H 2245/20; B01J 19/088
See application file for complete search history.

(56) References Cited

U.S. PATENT DOCUMENTS

| | | | |
|---|---|---|---|
| 6,652,715 B2 * | 11/2003 | McLaine | C02F 1/4602 204/671 |
| 2018/0086651 A1 * | 3/2018 | Lalli | C02F 1/4608 |
| 2018/0148353 A1 | 5/2018 | Foster et al. | |
| 2019/0322550 A1 | 10/2019 | Weltmann et al. | |

OTHER PUBLICATIONS

Jin, Yun & Cho, Chuhyun & Kim, Daejong & Sohn, Chae & Ha, Chang-sung & Han, Seong-Tae. (2020). Mass production of plasma activated water by an atmospheric pressure plasma. Japanese Journal of Applied Physics. 59. 10.35848/1347-4065/ab7e13.

* cited by examiner

WATER PURIFIER AND WATER PURIFICATION SYSTEM

CROSS-REFERENCE TO RELATED APPLICATIONS

This application claims priority to European Application Number EP20209002.3, filed Nov. 20, 2020, the entire contents of which are hereby incorporated in full by this reference.

DESCRIPTION

Field of the Invention

The present invention concerns a water purifier and a water purification system.

Background of the Invention

The process to disinfect biologic water contaminants such as viruses, bacteria, algae and the like has traditionally been carried out by ultrafiltration processes and/or chemical processes, among the most used is the addition of chlorine. Ultrafiltration is rather costly and, therefore, not suitable for purifying drinking water in the household setting. Chlorine, on the other hand, has an effect of approximately 6 hours which makes it necessary to constantly add this chemical to stored water. The risk associated with using chemicals is an overdosing of the respective chemical which deteriorates the taste of the water and which can be toxic to humans or, in case of an underdosing, fails to kill the potentially infectious biological contaminants.

Ultraviolet radiation is used for disinfecting drinking water, e.g., in water dispensing devices. However, it is a rather time consuming and thus inefficient disinfection process. It can also be dangerous in contact with the skin and eyes for humans.

Further, ozonators are used, which generate and inject ozone into the water to be purified. Ozone is widely used since it is about 3000 times faster to react than chlorine. Its main problem is that it is not capable of killing the entire microbial load contaminating the water. Likewise, if the ozone concentration in the ambient air exceeds e.g., 240 $\mu g/m^3$ for more than eight hours, there is a clear risk to health.

U.S. Pat. No. 5,635,059 of inventor Dennis E. J. Johnson shows a system that uses ionic charges of oxygen and air generated by plasma to generate different components such as copper nitrate algicide and the like that are known to eliminate biological contaminants in water. This system further makes use of lamps that emit radiation ultraviolet and infrared radiation which contribute to the elimination of viruses and bacteria.

Patent number JP4947807B2 filed in Japan uses plasma as a purification system to remove different biological loads from water. This known purification system uses plasma micro-discharges through a mesh with holes in the order of micrometers through which the water to be purified flows. The problem with this technique is that the purification speed is too low for most, in particular, even household applications.

The objective of the present invention is to provide a low-cost water purifier, which allows for a reliable disinfection of biological and possibly infectious contaminants of water at an improved rate, in particular for purifying drinking water in the household setting or for purifying water in irrigation systems for crop cultivation or water used in the pharmaceutical industry.

SUMMARY OF THE INVENTION

The object of the invention is solved by a water purifier according to claim 1.

The water purifier comprises:

a. an inlet port for the water to be purified and an outlet port for the purified water;

b. a water treatment chamber fluidly connected to the water inlet and the water outlet, the said water chamber being confined by chamber wall; and c. a high-voltage plasma unit for generating a cold plasma, the plasma unit having a first electrode and a second electrode, wherein the first electrode is arranged inside the water treatment chamber such that, during use of the water purifier, it is contacted by the water and a second electrode, which is disposed spaced apart from the first electrode and electrically insulated therefrom by a dielectric.

The water purifier according to the present invention allows for an efficient disinfection of the biological contaminants present in the water while flowing through the water treatment chamber by use of a high-voltage plasma. The biological contaminants may comprise viruses, bacteria, algae, protozoa, as well as prions (=misfolded proteins associated with Creutzfeld Jacob's disease). The plasma unit generates a dielectric barrier discharge, which generates an air plasma discharge in the water capable of disrupting virus envelopes and bacterial walls, viral and bacterial RNA/DNA as well as possibly hazardous prions.

It needs to be noted that the biological debris generated by the high-voltage (cold) plasma is not retained in the water treatment chamber, as is the case in conventional water filters. This is advantageous as to the service life of the water purifier. It is to be understood however, that the water purifier nevertheless may have one or more filter media arranged up- or downstream of the water purification chamber (=reactor) to filtrate particulate matter from the water which could cloud the water or otherwise effect the taste of the water.

According to a preferred embodiment of the invention, the chamber wall comprises the dielectric or consists of the dielectric. The dielectric can, according to the invention, be glass, a dielectric resin or ceramics such as aluminium oxide. Glass has many advantages and is available on the market in any size and geometry at low costs. Further, glass can be rather easily provided with a non-stick surface, in particular by a suitable coating thereof, to prevent adherence of debris thereon.

The second electrode of the plasma unit can be either fully embedded in the dielectric or, alternatively, be positioned on the outside of the dielectric, that is on the side of the dielectric facing away from the first electrode. If the second electrode is embedded in the dielectric, a corrosion or otherwise wear of the second electrode can be reduced.

According to a preferred embodiment of the invention, the chamber wall of the water treatment chamber has a cylindrical shape. This allows for a rather homogenous generation of the plasma within the spatial volume of the water treatment chamber around the first electrode. Further, the cylindrical shape allows for a cost-efficient manufacture of the water purifier.

According to a further preferred embodiment of the invention, the first electrode extends along the longitudinal axis of the chamber wall. Thereby, the water flowing through the water treatment chamber can be exposed to the plasma in a way sufficient for degradation of the biological load contained therein.

The second electrode, according to the invention, can advantageously be ring-shaped and, preferably fully, encompasses the water treatment chamber in a circumferential direction thereof. The ring-shaped design of the second electrode allows for an effective plasma discharge throughout the spatial volume of the water treatment chamber.

According to a yet further preferred embodiment of the invention, tone of the housing parts comprises a water line connector and the other housing part comprises an water outlet connector. This allows for a cost-efficient manufacture and easy use of the water purifier.

According to the invention the water inlet is formed by one of the housing parts and the water outlet is formed by the respective other housing part. The chamber wall, with each of its free axial ends, is preferably sealingly connected to both housing parts, in particular sealingly seated in a (mounting or holding) bore of both housing parts. This modular design allows for a simple mounting and servicing of the water purifier. Also, the water-tight sealing of the chamber wall against the housing parts can be easily realized, e.g., by a seal ring or by gluing.

According to a preferred embodiment of the invention, the water inlet is positioned eccentrically with regards to the longitudinal center axis of the water treatment chamber. This allows for a lateral flow of the water through the water treatment chamber close to the dielectric and an improved efficacy of the plasma. During use of the water purifier, the flow rate of the water to be purified is set such that a laminar flow through the water treatment chamber is ensured. Contrary to a turbulent flow of water, this further facilitates a proper purification of the water inside the water treatment chamber.

According to an embodiment of the invention, the opening area of the water inlet is larger than the opening area of the water outlet of the water treatment chamber. This facilitates a laminar flow of the water through the water treatment chamber which, in contrast to a turbulent water flow, allows for a highly efficient purification of the organic contaminants. According to a further embodiment of the invention, the opening area of the water inlet is smaller than 80% of the opening area of the water outlet.

The opening area of the water inlet, according to the invention, is preferably between 10 and 25% of the cross-sectional area of the water treatment chamber. During use of the water purifier, this allows for a geometrically defined (preferably laminar) jet of water in a predefined distance from the first and second electrode. This can be beneficial for the effectiveness of the purification process.

The water purifier, according to the invention, may be adapted for table-top use, faucet mount or faucet-integrated (built-in) use thereof.

The water purification system according to the invention comprises a housing and a water purifier as described above seated therein. The water purifier is preferably fluidly connected to a water reservoir or water storage vessel arranged within the housing. The water storage vessel may serve for storing the purified water. It is to be understood, that the water reservoir may be equipped with a cooling means to keep the water contained therein cool.

The housing of the water purifier can be provided with withdrawal means, e.g., an outlet tap, for the purified water.

There may be classic water filters provided up- and/or downstream the water purification chamber to reduce particulate matter or other contaminants contained in the water.

BRIEF DESCRIPTION OF THE DRAWINGS

The novel features characteristic of the present invention are set forth in the appended claims. However, the invention itself, as well as, a preferred mode of use, and further objective and advantages thereof, will best be understood by reference to the following detailed description when read in conjunction with the accompanying drawings, wherein:

DETAILED DESCRIPTION OF THE PREFERRED EMBODIMENTS

Figure 1:
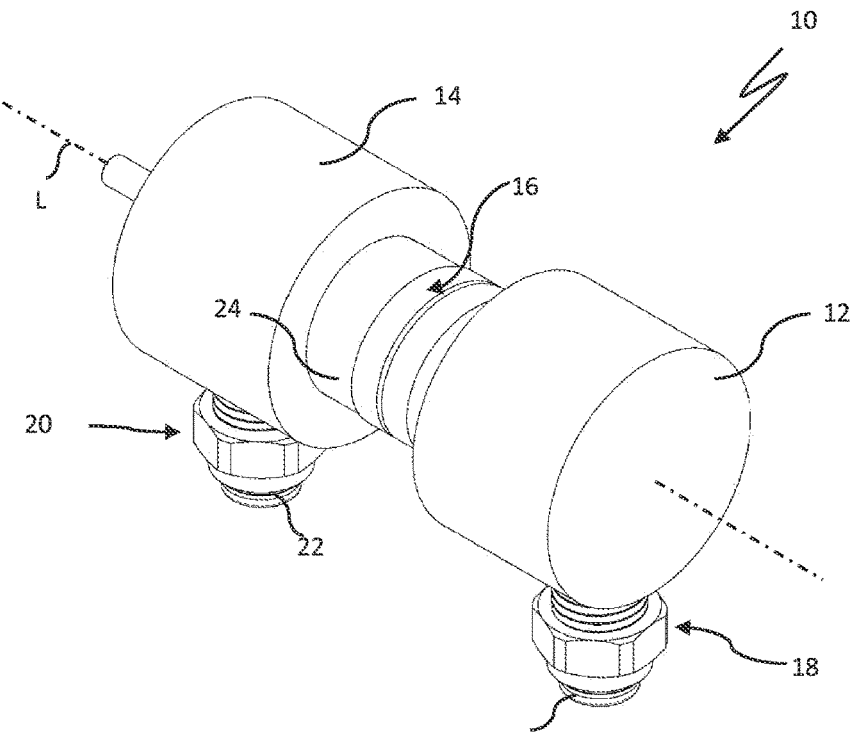
FIG. 1 is a water purifier according to the invention in a perspective view.
Figure 2:
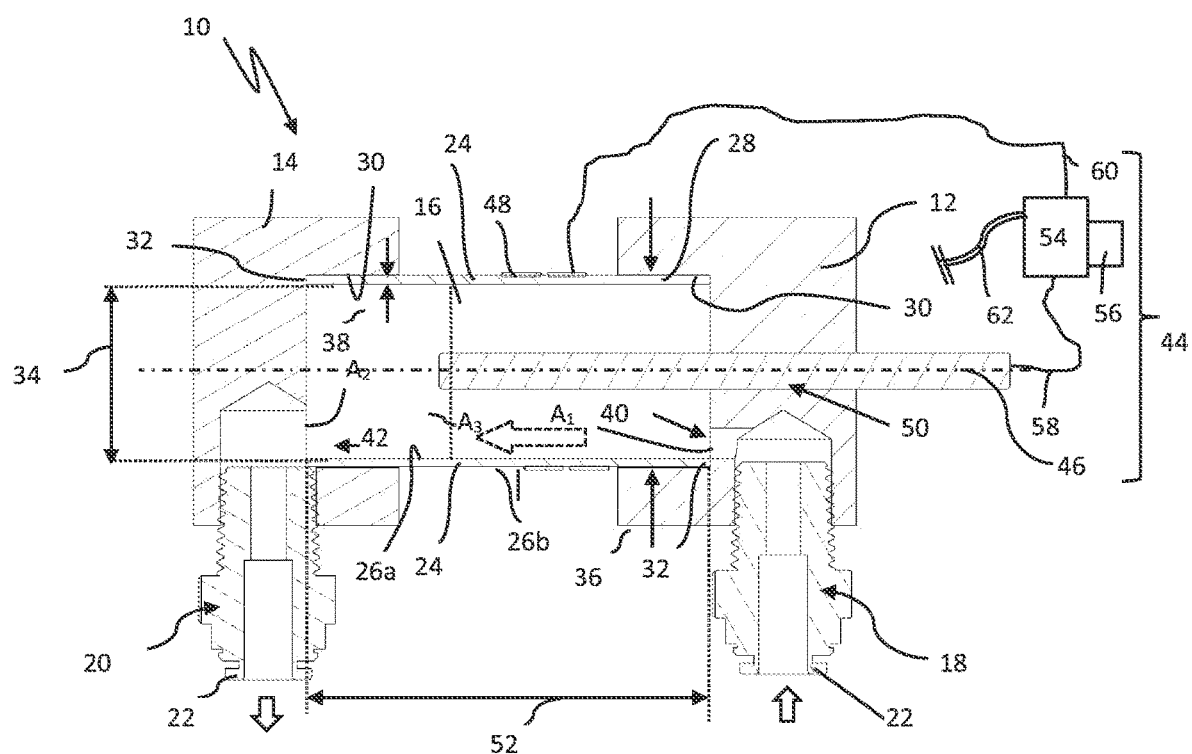
FIG. 2 is the water purifier according to FIG. 1 in a longitudinal sectional view.

FIGS. 1 and 2 show a water purifier 10 which is especially suited for purifying drinking water for household, in particular kitchen, use. The water purifier 10, more precisely, allows for disinfecting drinking water with regards to any potentially infectious biological contaminants such as, for instance, viruses, bacteria, protozoa or algae. The water purifier 10 may, for instance, be used as a faucet mounted water purifier 10 or as a faucet-integrated (built-in) water purifier 10.

The water purifier 10 comprises a first and a second housing part 12, 14 and a reactor or water treatment chamber 16 disposed in between the two housing parts 12, 14. The first housing part 12, is provided with a water inlet connector 18 for connecting of a water line thereto. The second housing part 14 is provided with a water outlet connector 20 for connecting a purified water line thereto.

Each of the connectors 18, 20 may be provided with coupling means 22 such as a connector flange or a connection thread for a secure connection of a respective water line not shown in the drawings.

The water treatment chamber 16 is at least partially defined by a chamber wall 24 which extends along its longitudinal central axis L from the first to the second housing part 12, 14. The chamber wall 24 confines the water treatment chamber in a radial direction with respect to the longitudinal central axis L thereof. The chamber wall 24, according to FIG. 2, preferably has a hollow circular cylindrical form. In other words, the chamber wall 24 is designed as a tube.

The chamber wall 24 has an inner and an outer surface 26a, 26b and is made from a dielectric 28. The chamber wall may be seated in a mounting bore 30 of both housing parts 12, 14 with each of its free ends 32 in a sealing manner. This sealing seat of the chamber wall 24 can be achieved, for instance, by a radial and/or axial press-fit of the chamber wall 24 within the mounting bores 30. Additionally or alternatively, the chamber wall 24 can be glued to the housing parts 12, 14 or there can be an elastomeric seal disposed in between the chamber wall 24 and each of the housing parts 12, 24. In the embodiment shown in FIGS. 1 and 2, the chamber wall has an exemplary internal diameter 34 of 22.3 millimeters and an external diameter 36 of 25.3 millimeters. The chamber wall thickness 38 is thus 3 millimeters.

As can be seen from FIG. 2, the first housing part 12 defines a water inlet 40 of the water treatment chamber 16. The water inlet 40 has an opening area denominated $A_1$. The water inlet 40 is preferably positioned eccentrically with regards 24 to the longitudinal center axis L of the water treatment chamber 16.

The second housing part 14 defines the water outlet 42 of the water treatment chamber 24 (=reactor). The water outlet 42 has an opening area denominated $A_2$. The cross-sectional area of the water treatment chamber 16 is denominated $A_3$. The water inlet 40 opening area $A_1$ is smaller than the opening area $A_2$ of the water outlet 42. Preferably, the water inlet 40 opening area $A_1$ is smaller than 80% of the opening area $A_2$ of the water outlet 42. Further, the size of the opening area $A_1$ of the water inlet 40 is preferably between 10% and 25% of the size of the cross-sectional area of the water treatment chamber 16. The water inlet 40 can, for instance, have a diameter of 3 to 4 millimeters in a water purifier 10 for household use. The water inlet 40 fulfills the function of limiting the volume flow rate Q of the water with respect to the cross sectional area $A_3$ of the water chamber 16 to a predefined maximal volume flow rate value $Q_{max}$. This allows for a reliable disinfection of the organic matter contained in the water.

The housing parts 12, 14 may be made of stainless steel, titanium or any other suitable material.

The water purifier 10 further comprises a plasma unit overall denominated 44 for generating a dielectric barrier discharge inside the water treatment chamber 16 by which the water is disinfected. The plasma unit 44 comprises a first or inner electrode 46 and a second or outer electrode 48. The first electrode 46 is arranged on and extends along the longitudinal central axis L of the chamber wall 24. In other words, the chamber wall 24 and the first electrode 46 are arranged concentrically.

The first electrode 46 can, for instance, be arranged in a through-hole 50 of one of the housing parts 12, 14 and extends over at least half of the length, preferably at least two thirds of the length 52 of the water treatment chamber. In the embodiment shown in FIG. 2, the first housing part 12 is provided with the through-hole 50 with the first electrode 46 extending there through.

For the generation of the plasma, the plasma generator 54 has an output voltage of 10 kilovolts or more and up to one Ampere of alternating electrical current with a variable frequency between 10 kilohertz to 70 kilohertz. Preferably, for control of all operating parameters of the plasma generator 54, there is a, preferably programmable, control unit 56.

The first electrode 46 is preferably made of stainless steel. In the embodiment shown in FIG. 2, the first electrode is made of ⅛ inch 304L stainless steel. The first electrode may have a circular cylindrical shape.

The second electrode 48 of the plasma unit 44 is arranged on the outside of the chamber wall 24. The second electrode 48 is preferably ring-shaped and fully encompasses the water treatment chamber 16 in a circumferential direction thereof. The second electrode 48 can, for instance, be wound around the chamber wall 24 in a helical fashion as can be seen in FIG. 2. The second electrode 48 may, for instance, be designed as a copper spiral. The spiral can be composed of e.g., 3, 4, 5 or more equidistant turns.

The first electrode 46 is connected to the plasma generator via an electrically conductive live wire 58, whereas the second electrode 48 is connected to the plasma generator via an electrically conductive neutral wire 60. The plasma unit generates a so-called dielectric barrier discharge which generates an air plasma discharge in the water by which potentially infectious water contaminants are disrupted and/or inactivated.

The plasma generator 54 has a power supply cable 62 for connecting the plasma generator 54 to an electrical energy source (not shown in the Figs.), in particular the public power grid.

During use of the water purifier 10, the water to be purified is pressurized for forcing it through the water treatment chamber 16. For instance, the water can be pressurized to a pressure of 20 to 300 kPa. The water is guided to the water treatment chamber 16 via the inlet connector 18 of the first housing part 12. The water enters the water purification chamber 16 via the eccentric water inlet 40 thereof. The plasma unit 44 is operated under the control of the control unit 56 such that a dielectric discharge is generated inside the water treatment chamber 16 right where the water flows to disinfect the water whilst flowing through the water treatment chamber 16 in an axial direction towards the water outlet 42.

The disinfected water is drained from the water treatment chamber via the outlet 42 and the outlet connector 20 of the second housing part 14.

Figure 3:
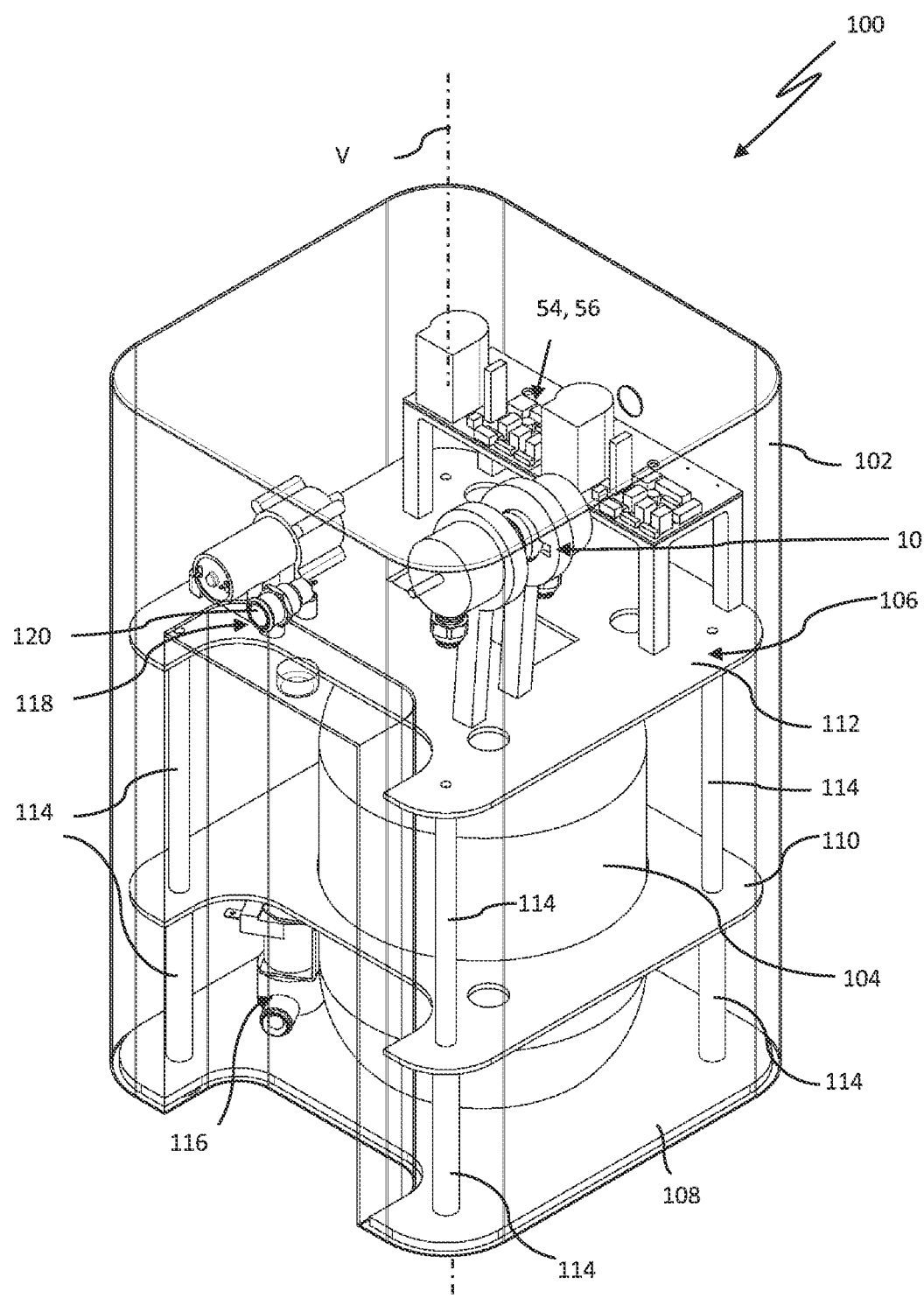
FIG. 3 is a ready-to-use tabletop water purification system comprising a water purifier according to FIGS. 1 and 2.

FIG. 3 shows a tabletop water purification system 100 which has a housing 102 and a water purifier 10 as outlined above with reference to FIGS. 1 and 2 which is at least partially or, preferably, fully arranged inside the housing 102. The water purification system 100 may comprise a reservoir or storage vessel 104 for the purified (disinfected) water.

The housing 102 may be supported from an internal support frame 106. The support frame may comprise a base plate 108, a middle plate 110 and an upper plate 112 which are arranged spaced apart from one another in the direction of the vertical axis V of the housing 102. There are vertical frame members 114 arranged in between the plates and by which the plates are interconnected.

The electronic assembly of the water purification system 100 is preferably mounted on the upper plate 112 of the support frame 106. The control unit 56 and the plasma generator 54 are clearly visible. The inlet connector 18 may be hooked up to a water line. The outlet connector 20 is fluidly connected (not shown) to the storage vessel 104 inside the housing. The storage vessel 104 is mounted on the base plate 108 to prevent the water purification system 100 from tipping over when in use. The middle plate 110 serves to hold the water storage vessel 104 in place and preferably fully embraces the same. There is a pump 116 provided which is fluidly connected to the water storage vessel 104 and which serves to pump the purified water to an outlet tap denominated 118. An operating element 120 such as pushbutton or the like serves for operation of the outlet tap. In FIG. 3, any tubing fluidly interconnecting the storage vessel 104 with the outlet connector 20 of the water purifier 10 and with the outlet tap 118, respectively, as well as the tubing fluidly connecting the inlet connector 18 of the water purifier 10 with a water line is not shown for illustrative purposes.

The water purifier 10 described hereinabove above is especially suited for household use. However, it can be envisioned, that the water purifier 10 can be parametrized for the central water supply of residential homes, commercial buildings or even a municipal or regional water supply. Further, the water purifier may be parametrized for irrigation systems as used for crop cultivation or even for use in the pharmaceutical sector.

What is claimed is:

1. A water purifier for home use, irrigation systems used for crop cultivation or the pharmaceutical industry, comprising:
   a water inlet for a water to be purified and a water outlet for a purified water;
   wherein the water inlet is positioned eccentrically with regards to a longitudinal center axis of the water treatment chamber;
   a first and a second housing part and a water treatment chamber disposed in between the first and the second housing parts;
   wherein the water treatment chamber is fluidly connected to the water inlet and the water outlet, and wherein the said water treatment chamber is being confined by a chamber wall, wherein the chamber wall has a cylindrical shape;
   wherein the water inlet is formed by one of the housing parts and the water outlet is formed by the respective other housing part, wherein the chamber wall, with each of its free ends, is sealingly seated in a bore of both of the housing parts; and
   a plasma unit for generating a cold plasma within the water treatment chamber, the plasma unit having a first electrode and a second electrode, wherein the first electrode is arranged inside the water treatment chamber such that, during use of the water purifier, it is contacted by the water and the second electrode, which is disposed spaced apart from the first electrode and electrically insulated therefrom by a dielectric;
   wherein an opening area A1 of the water inlet is smaller than an opening area A2 of the water outlet of the water treatment chamber.

2. The water purifier according to claim 1, wherein the chamber wall comprises the dielectric or consists of the dielectric, wherein the second electrode of the plasma unit is either fully embedded in the dielectric or positioned on an outside of the dielectric.

3. The water purifier according to claim 1, wherein the dielectric is glass, a dielectric resin or a ceramic such as aluminiumoxide.

4. The water purifier according to claim 1, wherein the first electrode extends along the longitudinal center axis of the chamber wall.

5. The water purifier according to claim 1, wherein the second electrode is ring-shaped and fully encompasses the water treatment chamber in a circumferential direction thereof.

6. The water purifier according to claim 1, wherein one of the housing parts comprises a water inlet connector and the other housing part comprises a water outlet connector.

7. The water purifier according to claim 1, wherein the opening area of the water inlet is smaller than 80% of the opening area A2 of the water outlet.

8. The water purifier according to claim 1, wherein the opening area A1 of the water inlet is between 10% and 25% of a cross-sectional area A3 of the water treatment chamber.

9. The water purifier according to claim 1, wherein the water purifier is dimensioned and designed for faucet mount or faucet-integrated use.

10. The water purification system comprising a housing and the water purifier according to claim 1, wherein the water purifier is connected to a water storage vessel arranged within the housing, the water storage vessel configured for the purified water.

11. The water purification system according to claim 10, wherein the housing is provided with an outlet tap for the purified water.

* * * * *